United States Patent [19]
Schechter

[11] Patent Number: 5,377,631
[45] Date of Patent: Jan. 3, 1995

[54] SKIP-CYCLE STRATEGIES FOR FOUR CYCLE ENGINE

[75] Inventor: Michael M. Schechter, Farmington Hills, Mich.

[73] Assignee: Ford Motor Company, Dearborn, Mich.

[21] Appl. No.: 124,172

[22] Filed: Sep. 20, 1993

[51] Int. Cl.$^6$ .............................................. F02B 77/00
[52] U.S. Cl. ............................................... 123/198 F
[58] Field of Search ................ 123/21, 198 F, 481, 123/90.12

[56] References Cited

U.S. PATENT DOCUMENTS

| | | | |
|---|---|---|---|
| 4,040,395 | 8/1977 | Demetrescu | 123/198 F |
| 4,064,844 | 12/1977 | Matsumoto et al. | 123/198 F |
| 4,144,863 | 3/1979 | Abdoo | 123/198 F |
| 4,172,434 | 10/1979 | Coles | 123/198 F |
| 4,250,850 | 2/1981 | Ruyer | 123/198 F |
| 4,489,695 | 12/1984 | Kohama et al. | 123/198 F |
| 4,509,488 | 4/1985 | Forster et al. | 123/198 F |
| 4,530,332 | 7/1985 | Harvey et al. | 123/481 |
| 4,541,387 | 9/1985 | Morikawa | 123/198 F |
| 4,608,952 | 9/1986 | Morita et al. | 123/198 F |
| 4,738,229 | 4/1988 | Wada et al. | 123/52 MB |
| 4,991,558 | 2/1991 | Daly et al. | 123/481 |
| 5,022,357 | 6/1991 | Kawamura | 123/90.11 |
| 5,038,739 | 8/1991 | Ishii | 123/198 F |
| 5,076,222 | 12/1991 | Kawamura | 123/90.11 |
| 5,099,816 | 3/1992 | Ohga et al. | 123/198 F |
| 5,125,370 | 6/1992 | Kawamura | 123/90.11 |
| 5,154,151 | 10/1992 | Bradshaw et al. | 123/481 |
| 5,161,494 | 11/1992 | Brown, Jr. | 123/90.11 |

FOREIGN PATENT DOCUMENTS 552052 10/1953 Canada ............................. 123/198 F

*Primary Examiner*—Noah P. Kamen
*Attorney, Agent, or Firm*—Jerome R. Drouillard; Roger L. May

[57] ABSTRACT

Strategies for operating a four cycle engine in skip-cycle manner include providing the engine with a valve control so that each intake and exhaust valve for each cylinder can be individually activated or deactivated essentially instantaneously to provide a skip-cycle pattern that varies as a function of the load. Individual of the valves permits changing the purpose of the stroke off each piston of each deactivated cylinder from compression to exhaust or intake to expansion, as the case may be, to assure firing of all of the engine cylinders within as short a period as one skip cycle to prevent cylinder cooldown, which promotes emissions. Unthrottled operation also is provided by closing the intake and exhaust valves in a particular sequence during skip cycle operation, and controlling the intake valve closure timing during load periods between skip cycle periods to continue unthrottled operation for all load levels. Further individual activation or deactivation of the fuel injectors and spark plugs enhances the skip cycle, unthrottled operation.

7 Claims, 3 Drawing Sheets

| FIRING ORDER | % OF FULL INDICATED LOAD |
|---|---|
| A  1-3-4-2 | 100% |
| B  1-3-S-2-4-S | 66 2/3% |
| C  1-3-S-S-4-2-S-S | 50% |
| D  1-S-S-3-S-S-4-S-S-2-S-S | 33 1/3% |

S DENOTES A SKIP-CYCLE

| | FIRING ORDER | % OF FULL INDICATED LOAD |
|---|---|---|
| A | 1-3-4-2 | 100% |
| B | 1-3-S-2-4-S | 66 2/3% |
| C | 1-3-S-S-4-2-S-S | 50% |
| D | 1-S-S-3-S-S-4-S-S-2-S-S | 33 1/3% |

S DENOTES A SKIP-CYCLE

SKIP-CYCLE STRATEGIES FOR FOUR CYCLE ENGINE

FIELD OF THE INVENTION

This invention relates in general to an automotive type four cycle engine, and more particularly, to strategies for operating the engine in a skip-cycle manner.

BACKGROUND OF THE INVENTION

Skip-cycle operation of a four cycle engine, with selected cylinders deactivated in accordance with a predetermined schedule as a function of the change in load, provides opportunities for fuel economy and control of emissions. An engine with a camless valvetrain offers exceptional opportunities for implementation of skip-cycle strategies at part-load.

U.S. Pat. No. 5,255,641, Variable Engine Valve Control System, Schechter, assigned to the assignee of this invention, and which is hereby incorporated by reference into this specification, is an example of a camless valvetrain in which the valve timing and lift, as well as the event duration are controlled by solenoid valves. In such a system, the action of the valves in each engine cylinder can be completely deactivated and then reactivated again within as little as one engine cycle of two revolutions. When coupled with a comparable ability to activate and deactivate the individual fuel injectors and spark plugs, this permits running the engine with a variety of skip-cycle strategies.

The variety of firing orders that can be selected under different engine operating conditions is enhanced by the fact that in an engine with a camless valvetrain, any upward stroke of the piston can operate as a compression stroke or as an exhaust stroke, and any downward stroke of the piston can alternate as an intake stroke or as an expansion stroke. The ability to isolate each cylinder so that the intake and exhaust valves can be individually controlled to disable the cylinder results in less energy dissipation within that cylinder.

If the intake valve is first closed after fuel delivery is terminated, followed by closing the exhaust valve, the cylinders are essentially purged of exhaust gases. Therefore, as long as the cylinder is disabled, the downward stroke of the piston creates merely a vacuum and the upward stroke will return the cylinder to essentially atmospheric pressure, thus permitting unthrottled operation of the engine with less friction in the deactivated cylinders.

This individual control of the intake and exhaust valves not only permits varying skip-cycle strategies as a function of change in load, but also it permits control of the timing of the closure of the intake valve during load conditions when each firing cylinder operates at part load to maintain unthrottled operation at all engine loads.

The invention utilizes the essentially instantaneous action of a camless valvetrain together with other strategies including those described above to provide a four cycle engine with a variety of skip-cycle operations that improve fuel economy and engine efficiency while reducing emission output.

DESCRIPTION OF THE PRIOR ART

In general, the use of cylinder deactivation is known in the prior art. Some prior art devices deactivate half of the engine cylinders by disengaging a two piece crankshaft. U.S. Pat. No. 4,509,488, Forster et al, U.S. Pat. No. 5,154,151, Bradshaw et al., U.S. Pat. No. 4,991,558, Daly et al., and U.S. Pat. No. 5,038,739, Ishii, describe skip-cycle controls that control essentially only the supply of fuel to one or more cylinders for skip-cycle operation, rather than individually controlling the intake and exhaust valves, this being necessary in the Bradshaw and Daly devices because of their applications to two cycle engines.

U.S. Pat. No. 4,530,332, Harvey et al., and U.S. Pat. Nos. 5,022,357, 5,076,222, 5,125,370, Kawamura, describe control systems for an engine in which the lift and duration of the valves is controlled electronically as well as the fuel injected as a function of load to maintain a stoichiometric mixture.

In many instances, the prior art devices utilize cam operated valvetrains, which generally do not permit the instantaneous deactivation of a particular engine cylinder because of the mechanical construction and actuation. The prior art skip-cycle devices that do not disable the intake or exhaust valves experience both pumping and compression losses in the disabled cylinder. A further heat loss is experienced if a significant time occurs between disabling of the cylinder and reactivation, so when reactivated, an expulsion of unburned hydrocarbons and other undesirable emissions can occur.

SUMMARY OF THE INVENTION

The invention provides strategies for operating a four cycle automotive type engine in the skip-cycle manner. The engine preferably has a camless valvetrain in which the intake and exhaust valves are controlled individually by solenoids or other similar means so that each cylinder can be deactivated or reactivated essentially instantaneously, thus permitting a variety of skip-cycle patterns in a very short number of crankshaft revolutions. A variety of firing orders can be selected due to that fact that the upward stroke of the piston of a deactivated cylinder can alternate as a compression stroke or an exhaust stroke, and any downward stroke of the piston can alternate as an intake stroke or as an expansion stroke. As a result, a skip-cycle pattern can be established in which the number of cylinders being deactivated will vary as a function of the load, with, however, all of the cylinders being fired within as short a number of revolutions of the engine crankshaft as possible so that none of the cylinders experiences a cooldown that would promote the production of unburned hydrocarbons and other undesirable emissions.

The individual control of the valves for each cylinder also promotes unthrottled engine operation, which eliminates pumping and reduces compression losses and limits the losses only to friction. Such a control also permits late or early closure of the intake valves during engine load periods between the load points at which each of the firing cylinders operates at full indicated load so that the volume of the air/charge trapped in the cylinder will maintain unthrottled operation over the entire engine load range.

It is, therefore, a primary object of the invention to provide a skip-cycle automotive type engine with a variety of skip-cycle strategies for fuel economy and emission control by individually controlling the intake and exhaust valves of each cylinder to provide unthrottled operation to avoid engine pumping losses, to control the timing and duration of the intake valves to control the volume of air trapped in the cylinder to maintain unthrottled operation over the entire load range, and to vary the purpose of the stroke of the piston of each deactivated cylinder to vary the firing order so that all of the engine cylinders are fired within a predetermined or limited number of engine revolutions to prevent cooldown of any one deactivated cylinder with respect to the others, to reduce emission output.

It is a further object of the invention to provide a four cycle engine of the type described with the ability to vary the firing order so that all cylinders fire over two, or three, or four, or six, or other numbers of revolutions, depending upon the skip-cycle selected, and that the combination of skip-cycle with late or early intake valve closing provides for unthrottled engine operation at all loads, with the ability to trap a minimum air quantity in a deactivated cylinder for reduced friction.

Other objects, features and advantages of the invention will become more apparent upon reference to the succeeding, detailed description thereof, and to the drawings illustrating the preferred embodiments of the invention.

DESCRIPTION OF THE PREFERRED EMBODIMENT

As described above, the invention is designed primarily for use with a four cycle engine in which each of the intake and exhaust valves for each individual cylinder can be controlled electronically to be activated or deactivated individually.

Figures 1, 2:
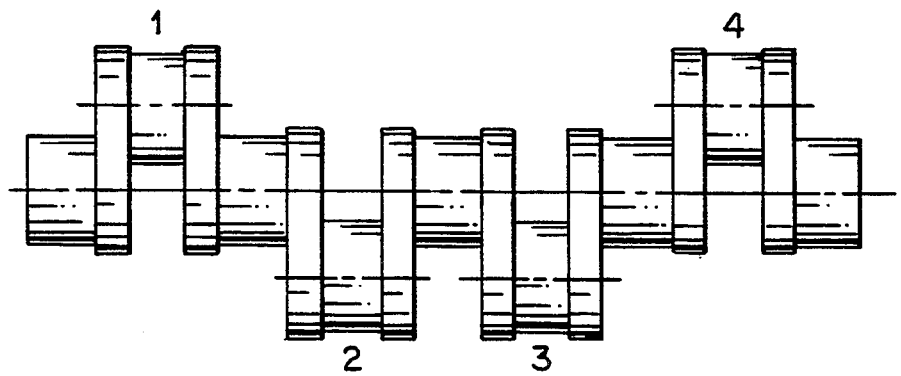
FIG. 1 schematically illustrates a crosssectional view of an engine crankshaft for a four cylinder, four cycle engine.
FIG. 2 is a tabular representation of several skip-cycle strategies embodying the invention and varying as a function of varying engine load levels.

FIG. 1 shows a diagram of an engine crankshaft for a four cylinder, four cycle engine having four crank throws 1, 2, 3, and 4. They are adapted to be connected in a known manner by connecting rods, not shown, to pistons within individual cylinders, also not shown. The particular firing order in this case is chosen to be cylinders 1-3-4-2. When throws 1 and 4 are in the upward position near or at the top dead center position, as shown, establishing the strokes of the pistons connected thereto in either the compression or exhaust strokes, the cylinder associated with throw 1 will be fired, for example, with the cylinder for throw 4 being on the exhaust stroke. Likewise, when throws 2 and 3 are in the up position, one will be fired while the other is on a different stroke.

Because each of the intake and exhaust valves can be controlled individually, this permits change of the purpose of the stroke of the piston to change the firing order to suit the particular skip-cycle desired according to the change in load.

More particularly, FIG. 2 is a tabular representation of the changes in firing order as a function of four distinct load levels, while yet maintaining firing of all of the cylinders within as short a period as possible to prevent cooldown of any one particular deactivated cylinder. The latter would promote the production of unburned hydrocarbons and other undesirable emissions.

Case A of FIG. 2 indicates that at 100% of full indicated load, all cylinders would be fired within two crankshaft revolutions. Case B indicates a skip-cycle sequence in which two of the cylinders are deactivated during the sequence thereby establishing all four cylinders firing within three engine crankshaft revolutions.

Although each firing cylinder works at full indicated load during each firing cycle, the indicated power of the entire engine is only $66\frac{2}{3}\%$ of the indicated power in Case A at the same engine speed. In cases C and D, the four cylinders fire in four and six engine revolutions, respectively, and, therefore, only 50% or $33\frac{1}{3}\%$, respectively, of full indicated power is produced. It will be clear, of course, that each of the firing cylinders also can operate at less than full indicated load in any of the four cases.

It should be noted that in the above skip-cycle sequences of cases B, C and D, the purpose of the stroke of the piston of the deactivated cylinder would be changed in each case to allow it to be fired essentially within the next revolution so that all of the cylinders are fired within one complete skip-cycle period of time, or in as short a period of time as is possible to complete the skip-cycle sequence.

More specifically, in case B, for example, the firing order is 1-3-S(4)-2-4-S(3)— and then the pattern repeats itself. S indicates a skipped cylinder, indicated in parenthesis. When throws 1 and 4 are up, the cylinder associated with throw 1 is fired. Then when throws 2 and 3 are up, cylinder 3 is fired. When cranks 1 and 4 again are up, cylinder 4 is deactivated. When throws 2 and 3 again come up, cylinder 2 is fired. Now when throws 1 and 4 again are up, normally cylinder 4 would fire. However, the purpose of the strokes of the pistons of cylinders 1 and 4 now are changed so that now cylinder 4 would fire. When next cranks 2 and 3 are up, cylinder 3 would be deactivated, and again reactivated with a changed piston working stroke as soon as the cranks 1 and 4 complete the upward strokes.

Case C indicates a pair of firings coupled with a pair of skip firings followed by the firing of the remaining two cylinders so that all of the cylinders are fired as soon as possible in as short a skip-cycle sequence as possible. In this case all fire within four crankshaft revolutions. This prevents cooldown of any one particular engine cylinder.

Figure 4:
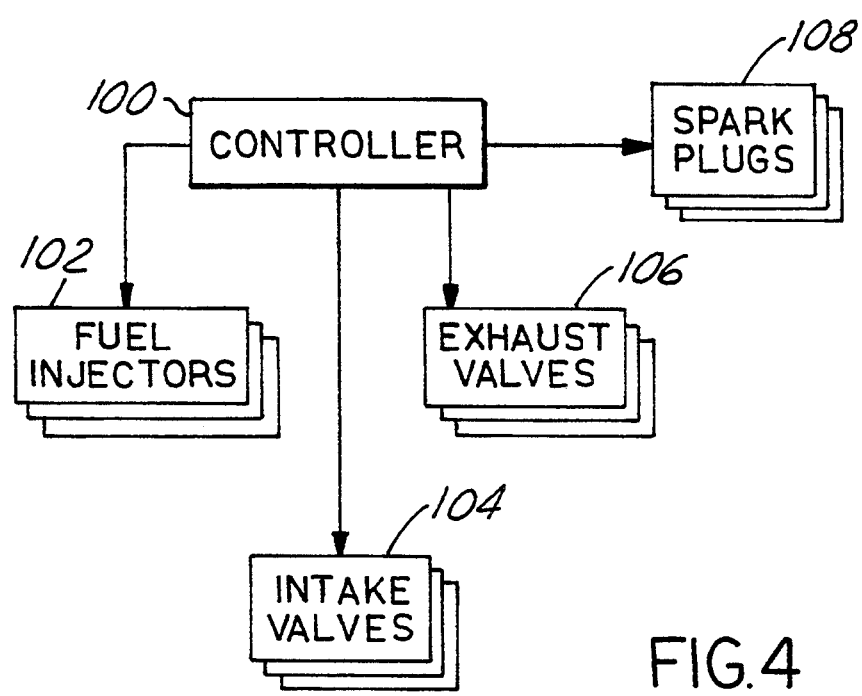
FIG. 4 is a block diagram of an engine and control system according to the present invention.

At the various load points indicated by cases A, B, C and D, the engine runs unthrottled since each activated cylinder works at full indicated load during each firing cycle, and neither air nor fuel are inducted into the deactivated cylinder because the valves of that cylinder are kept closed during the skip-cycle. In between the above load points, and below the point of case D, the firing cylinders operate at part-load but the engine remains unthrottled because the air flow to the firing cylinders can be controlled by delaying or advancing the timing of the intake valve closure to thus vary the volume of the air trapped in the cylinder. Running the engine unthrottled throughout the entire load range, therefore, essentially eliminates pumping loop loss and thus improves fuel economy. As shown in FIG. 4, controller 100 operates a plurality of fuel injectors 102, a plurality of intake valves 104, a plurality of exhaust valves 106, and a plurality of sparkplugs 108, with at least one intake valve, at least one exhaust valve, at least one fuel injector, and at least one sparkplug per cylinder.

With respect to deactivation of any particular cylinder, the sequence for doing so would be to first deactivate the fuel injector 102 while the exhaust gas is permitted to complete its cycle. This would be followed by deactivating the intake valve 104 to shut off the intake of any further air, followed by deactivation of the exhaust valve 106 once the piston on its exhaust stroke has pushed out most of the remaining cylinder exhaust gases. The volume of the gas trapped in the cylinder at close to the top dead center position of the piston, therefore, would be very small, so that the mean pressure in the cylinder during the skip-cycle would be only a fraction of the barometric pressure. As a result, the gas forces acting on the piston would also be small, which would contribute to low cylinder friction during the skip cycle period. The sequence of reactivation would be the same as during deactivation.

While the invention has been shown and described in connection with the specific load level examples of FIG. 2, it will be clear that the firing orders are only illustrative, and that other skip cycle sequences would be effected as the load changes from the examples of cases A-D.

As it was described in connection with the four cylinder engine, it will be clear that a large variety of skip cycle strategies can also be applied to engines with six, eight or other numbers of cylinders.

From the foregoing, it will be seen that the invention provides a skip-cycle strategy for a four cycle engine with a valvetrain actuation mechanism that permits a variety of firing orders upon selective activation of the valves of individual cylinders and reactivation with a changing of the purpose of the stroke of the piston of a deactivated cylinder to establish firing of all of the engine cylinders within as short a period as one complete skip cycle so that cooldown of any deactivated cylinder does not occur. It will also be seen that coupled with the individual control of the injection of fuel and activation and deactivation of the spark plugs, the engine can be provided with unthrottled operation that essentially eliminates the pumping loop losses and thus improves the fuel economy of the engine.

Figure 3:
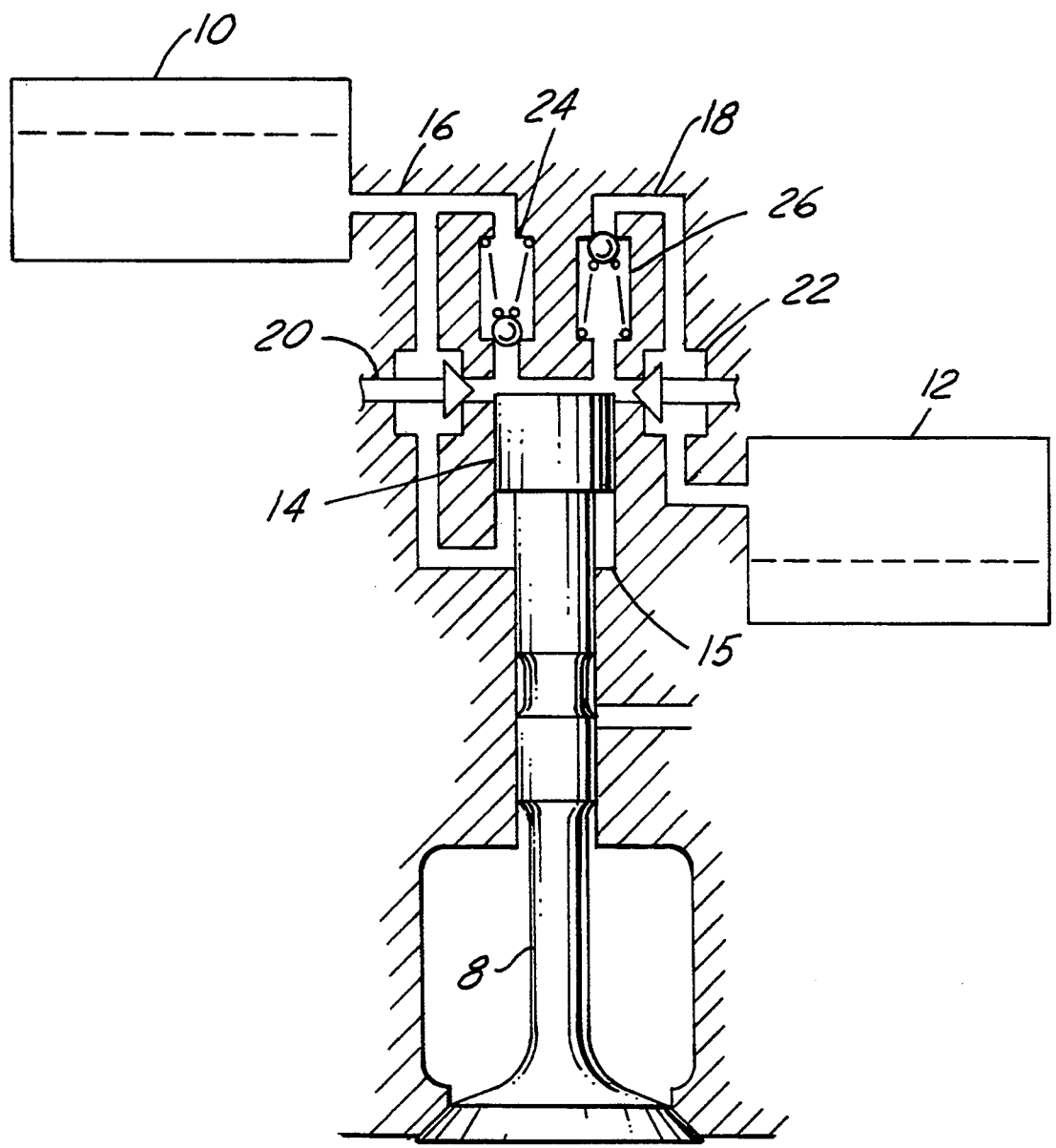
FIG. 3 is a schematic of an electrohydraulic camless valve system which is suitable for practicing the present invention.

A system and process of for controlling valve opening and closing so as to permit implementation of the present invention essentially as described and shown in FIG. 1 in U.S. Pat. No. 5,255,641 previously referred to, is illustrated in FIG. 3. The camless, electrohydraulic system incorporates high and low-pressure oil reservoirs 10 and 12, respectively. Piston 14 fixed to the top of engine valve 8 rides in sleeve 15. The volume above piston 14 can be connected to either high-pressure rail 16 or low pressure rail 18. The volume below the piston is always connected to high pressure rail 16. The pressure area above the piston is approximately double the pressure area below the piston. The valve opening is controlled by high-pressure solenoid valve 20 which is open during valve acceleration and closed during deceleration. Opening and closing of low pressure solenoid valve 22 controls the valve closing. The system also includes high and low-pressure check valves 24 and 26, respectively. The solenoid valves will normally be operated by an engine control computer of the type known generally to those skilled in the art and suggested by this disclosure.

During the opening of valve 8, high-pressure solenoid valve 20 opens and the net pressure force acting on the piston 14 accelerates engine valve 8 downward. When solenoid valve 20 closes, pressure above piston 14 drops, and piston 14 decelerates pushing the fluid from the volume below it back into high-pressure rail 16. Low-pressure fluid flowing through low-pressure check valve 26 fills the volume above the piston during deceleration. When the downward motion of valve 8 stops, check valve 26 closes, and engine valve 8 remains locked in its open position.

The process of valve closing is similar in principle to that of the valve opening. Low-pressure solenoid valve 22 opens, the pressure above piston 14 drops, and the net pressure force acting on piston 14 accelerates engine valve 8 upward. When solenoid valve 22 closes, pressure above piston 14 rises and piston 14 decelerates, pushing the fluid from the volume above it through high-pressure check valve 24 back into the high pressure rail.

Varying the timing of activation of solenoid valves 20 and 22 varies the timing of the engine valve opening and closing. Valve lift can be controlled by varying the duration of the solenoid voltage pulse. Changing fluid pressure in the high-pressure rail permits control of valve acceleration, velocity and travel time.

While the invention has been shown and described in its preferred embodiments, it will be clear to those skilled in the arts to which it pertains that many changes and modifications may be made thereto without departing from the scope of the invention.

I claim:

1. In an automotive type four cycle multicylinder engine having intake and exhaust valves for each and every cylinder, the improvement comprising valve control means including means for operating the engine in a variety of skip cycle strategies by deactivating, in inverse proportion to the change in the load level, one or more of the cylinders during engine operation, the means further including means for converting the stroke of the piston of a deactivated cylinder from its set stroke in the four cycles of engine operation to an earlier stroke in the cycle to assure the sequential firing of each of the cylinders all within a predetermined limited number of revolutions of the engine crankshaft defined by one complete skip cycle sequence for the particular load level.

2. An automotive engine according to claim 1, further comprising means for controlling the opening duration of the intake valve during load periods when the firing cylinders operate at part-load to control the volume of air trapped in the firing cylinders in a manner to provide unthrottled engine operation.

3. In an automotive type four cycle multicylinder engine, a camless, electrohydraulic valvetrain with valve control means for selectively and individually opening and closing each of the intake and exhaust valves for each and every cylinder, the valve control means comprising means promoting operating the engine in an unthrottled manner by a variety of skip cycle strategies by deactivating in inverse proportion to the change in the load level one or more of the cylinders during engine operation while assuring sequential firing of the one or more, as well as the remaining, cylinders totally within a predetermined controlled number of revolutions of the engine crankshaft varying as a function of the load, said latter means including the valve control means for maintaining closed the intake and exhaust valves of each of the one or more cylinders being deactivated, thereby eliminating the intake of air and the exhaust of gases thereby eliminating pumping and reducing compression losses, the selective control of the opening and closing of the intake and exhaust valves permitting the selective changing of the cylinders firing order by converting the stroke of the piston of the cylinder in a selective manner from intake to expansion or compression to exhaust to assure firing in an earlier cycle than its normal sequence of the deactivated cylinder upon reactivation to thereby assure firing of all of the cylinders within the predetermined number of revolutions.

4. A method of operating an automotive type four cycle engine in the skip cycle manner including the steps of:

deactivating the supply of fuel to one or more cylinders to be deactivated;

in succession, closing and maintaining closed the intake and exhaust valves of the cylinders to be deactivated; and reactivating and firing each of the one or more deactivated engine cylinders in an earlier cycle than its normal sequence and within one complete skip cycle sequence for the particular load level has occurred to minimize cooldown of cylinders previously deactivated.

5. A method according to claim 4, further comprising operating the engine unthrottled over the entire engine load range.

6. A method according to claim 4, further comprising the step of controlling the timing of the intake valve closure during load periods when the firing cylinders operate at part-load to vary the volume of air trapped in the cylinders to promote unthrottled operation.

7. A method according to claim 4, further comprising the step of selectively changing the purpose of the piston stroke of a deactivated/skip cycle cylinder from intake to expansion or compression to exhaust as the case may be to selectively fire the deactivated cylinder in an earlier cycle in the normal four cycle of operation upon reactivation to enhance deactivation and reactivation of individual cylinders over a period of time as short as one cycle.

* * * * *